(12) United States Patent
Zhang (10) Patent No.: US 9,778,935 B2
(45) Date of Patent: Oct. 3, 2017

(54) SYSTEM AND METHOD FOR IMPROVING A STARTUP SPEED OF A WIRELESS HANDHELD DEVICE

(71) Applicant: Huawei Device Co., Ltd., Shenzhen, Guangdong (CN)

(72) Inventor: Xuegang Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 534 days.

(21) Appl. No.: 14/459,511

(22) Filed: Aug. 14, 2014

(65) Prior Publication Data
US 2014/0359262 A1  Dec. 4, 2014

Related U.S. Application Data

(63) Continuation of application No. PCT/CN2012/071221, filed on Feb. 16, 2012.

(51) Int. Cl.
| | |
|---|---|
| *G06F 9/00* | (2006.01) |
| *G06F 9/24* | (2006.01) |
| *G06F 15/177* | (2006.01) |
| *G06F 9/44* | (2006.01) |
| *G06F 9/445* | (2006.01) |
| *H04M 1/725* | (2006.01) |

(52) U.S. Cl.
CPC .............. *G06F 9/4401* (2013.01); *G06F 8/65* (2013.01); *H04M 1/72525* (2013.01)

(58) Field of Classification Search
CPC ..... G06F 9/4401; G06F 8/65; H04M 1/72525
See application file for complete search history.

(56) References Cited

U.S. PATENT DOCUMENTS

| | | | |
|---|---|---|---|
| 6,377,977 B1 * | 4/2002 | Sakata | G06F 9/5072 709/205 |
| 2001/0052121 A1 * | 12/2001 | Masuda | G06F 8/60 717/170 |
| 2008/0154974 A1 * | 6/2008 | Obata | G06F 11/1435 |
| 2009/0158023 A1 | 6/2009 | Kern | |

(Continued)

FOREIGN PATENT DOCUMENTS

| | | | |
|---|---|---|---|
| CN | 101853296 A | | 10/2010 |
| CN | 102012832 | * | 4/2011 |

(Continued)

*Primary Examiner* — Thomas Lee
*Assistant Examiner* — Zhipeng Wang
(74) *Attorney, Agent, or Firm* — Leydig, Voit & Mayer, Ltd.

(57) ABSTRACT

The present disclosure discloses a startup method and a wireless handheld device. The present disclosure relates to the field of communications technologies. The startup method includes: when a wireless handheld device is started, if it is detected that a $K^{th}$ Android installation package file in a data application directory is undergoing installation or updating, decompressing a library file of the $K^{th}$ Android installation package file to a preset subdirectory in the data application directory, where K is an integer greater than zero. A corresponding wireless handheld device is further provided. By adopting the present disclosure, a startup speed of the wireless handheld device can be improved.

14 Claims, 5 Drawing Sheets

(56) References Cited

U.S. PATENT DOCUMENTS

| | | | |
|---|---|---|---|
| 2010/0242037 A1 | 9/2010 | Xie et al. | |
| 2011/0131564 A1* | 6/2011 | Vidal | G06F 8/65 717/174 |
| 2013/0152045 A1* | 6/2013 | Jain | G06F 8/76 717/120 |

FOREIGN PATENT DOCUMENTS

| | | |
|---|---|---|
| CN | 102012832 A | 4/2011 |
| CN | 102207881 A | 10/2011 |
| CN | 102331947 A | 1/2012 |
| JP | 2001273121 A | 10/2001 |

* cited by examiner

When a wireless handheld device is started, if it is detected that a $K^{th}$ Android installation package file in a data application directory is undergoing installation or updating, decompress a library file of the $K^{th}$ Android installation package file to a preset subdirectory in the data application directory, where K is an integer greater than zero — B01

When it is detected that no APK file is undergoing installation or updating, do not execute the operation of decompressing the library file — B03

When the wireless handheld device is started, obtain a file name, creation time and a file size of each Android installation package file in a system application directory and a data application directory — B05

When the obtained file name of an $N^{th}$ Android installation package file has a corresponding record in a preset data base and the creation time and the file size of the $N^{th}$ Android installation package file are consistent with the creation time and the file size saved in the preset data base, read information of the $N^{th}$ Android installation package file from the preset data base and add the information of the $N^{th}$ Android installation package file into a package service list, where N is an integer greater than zero — B07

When the obtained file name of an $M^{th}$ Android installation package file does not have the corresponding record in the preset data base, or when the obtained file name of the $M^{th}$ Android installation package file has the corresponding record in the preset data base and the creation time and the file size of the $M^{th}$ Android installation package file are inconsistent with the creation time and the file size saved in the preset data base, obtain information of the $M^{th}$ Android installation package file, save the obtained information of the $M^{th}$ Android installation package file in the preset data base and add the obtained information of the $M^{th}$ Android installation package file into the package service list, where M is an integer greater than zero — B09

After the wireless handheld device is started, if one or more of the APK files in the system application directory and the data application directory are updated or deleted, synchronize the corresponding record saved in the preset data base; if a new Android installation package file is installed in the system application directory and the data application directory, save information of the installed new Androidinstallation package file into the preset data base — B11

SYSTEM AND METHOD FOR IMPROVING A STARTUP SPEED OF A WIRELESS HANDHELD DEVICE

CROSS-REFERENCE TO RELATED APPLICATIONS

This application is a continuation of International Application No. PCT/CN2012/071221, filed on Feb. 16, 2012, which is hereby incorporated by reference in its entirety.

TECHNICAL FIELD

The present disclosure relates to the field of communications technologies, and in particular, to a wireless handheld device startup method and a wireless handheld device.

BACKGROUND

Currently, as technology improves, wireless handheld devices have become a trend. For example, at present, a wireless handheld device adopting an Android (Android) operating system is favored by more and more users. Along with the development of the wireless handheld device adopting the Android operating system, more and more applications are installed in the wireless handheld device, so that startup of the wireless handheld device becomes slower and slower.

A solution in the prior art is to improve a startup speed through improvement of hardware configuration of the wireless handheld device; however, with the increase of installation of the applications, the startup speed of the wireless handheld device still gets lower.

SUMMARY

Embodiments of the present disclosure provide a wireless handheld device startup method and a wireless handheld device, to improve a startup speed of a wireless handheld device adopting an Android operating system.

On one aspect, a startup method is provided, which includes:

when a wireless handheld device is started, obtaining a file name, creation time and a file size of each Android installation package file in a system application directory and a data application directory;

when the obtained file name of an $N^{th}$ Android installation package file has a corresponding record in a preset data base and the creation time and the file size of the $N^{th}$ Android installation package file are consistent with the creation time and the file size saved in the preset data base, reading information of the $N^{th}$ Android installation package file from the preset data base and adding the information of the $N^{th}$ Android installation package file into a package service list, where N is an integer greater than zero; and when the obtained file name of an $M^{th}$ Android installation package file does not have a corresponding record in the preset data base, or when the obtained file name of an $M^{th}$ Android installation package file has a corresponding record in the preset data base and the creation time and the file size of the $M^{th}$ Android installation package file are inconsistent with the creation time and the file size saved in the preset data base, obtaining information of the $M^{th}$ Android installation package file, saving the obtained information of the $M^{th}$ Android installation package file in the preset data base, and adding the obtained information of the $M^{th}$ Android installation package file into the package service list, where M is an integer greater than zero.

On another aspect, another startup method is provided, which includes:

when a wireless handheld device is started, if it is detected that a $K^{th}$ Android installation package file in a data application directory is undergoing installation or updating, decompressing a library file of the $K^{th}$ Android installation package file to a preset subdirectory in the data application directory, where K is an integer greater than zero.

On another aspect, a wireless handheld device is further provided, which includes:

at least one read-only memory;
at least one random access memory; and
at least one processor coupled to the read-only memory and the random access memory, where the processor is configured to obtain a file name, creation time and a file size of each Android installation package file in a system application directory and a data application directory in the read-only memory when the wireless handheld device is started; when the obtained file name of an $N^{th}$ Android installation package file has a corresponding record in a preset data base in the read-only memory and the creation time and the file size of the $N^{th}$ Android installation package file are consistent with the creation time and the file size saved in the preset data base, read information of the $N^{th}$ Android installation package file from the preset data base and add the information of the $N^{th}$ Android installation package file into a package service list in the random access memory, where N is an integer greater than zero; when the obtained file name of an $M^{th}$ Android installation package file does not have a corresponding record in the preset data base, or when the obtained file name of an $M^{th}$ Android installation package file has a corresponding record in the preset data base and the creation time and the file size of the $M^{th}$ Android installation package file are inconsistent file with the creation time and the file size saved in the preset data base, obtain information of the $M^{th}$ Android installation package file, save the obtained information of the $M^{th}$ Android installation package file in the preset data base, and add the obtained information of the $M^{th}$ Android installation package file into the package service list, where M is an integer greater than zero.

On another aspect, another wireless handheld device is further provided, which includes:

at least one read-only memory;
at least one random access memory; and
at least one processor coupled to the read-only memory and the at least one random access memory, where the processor is configured to, when the wireless handheld device is started and if it is detected that a $K^{th}$ Android installation package file in a data application directory in the read-only memory is undergoing installation or updating, decompress a library file of the $K^{th}$ Android installation package file to a preset subdirectory in the data application directory, and K is an integer greater than zero.

The wireless handheld device startup method and the wireless handheld device provided by the embodiments of the present disclosure improve, through the technologies, the startup speed of the wireless handheld device adopting the Android operating system.

BRIEF DESCRIPTION OF THE DRAWINGS

To illustrate the technical solutions in the embodiments of the present disclosure or in the prior art more clearly, the accompanying drawings required for describing the embodiments or the prior art are introduced below briefly.

FIG. 4 is a flowchart of another startup method provided by Embodiment 4 of the present disclosure.

DETAILED DESCRIPTION

In order to make objectives, technical solutions, and advantages of the present disclosure more comprehensible, the present disclosure is described in further detail below with reference to the accompanying drawings and four embodiments.

Firstly, it should be noted that, a wireless handheld device described in an embodiment of the present disclosure includes, but not limited to, an electronic device with a wireless communication function, such as mobile phones of various standards, a smart mobile phone based an Android operating system, and a personal digital assistant PDA.

Each embodiment of the present disclosure is described with reference to the details discussed below, and each embodiment is illustrated by the accompanying drawings. The following description and drawings are illustrative for the present disclosure, and shall not be construed as a limit to the present disclosure. Many specific details are described to provide comprehensive understanding for each embodiment of the present disclosure. However, in some embodiments, well-known or conventional details are not described, so as to provide concise discussion on the embodiments of the present disclosure.

Some parts described below in detail are presented in the form of algorithms, and the algorithms include operations on data stored in a computer memory. Generally, an algorithm is an operation sequence obtaining an expected result. These operations usually require or involve physical manipulations of physical quantities. Generally (although not necessary), these quantities adopt the forms, such as electric or magnetic signals, capable of being stored, transmitted, combined, compared or manipulated in other manners. It has been proved that, sometimes, it is convenient to mention theses signals as bits, values, elements, symbols, characters, items and numbers, which is mainly for the sake of universality.

However, all of these and similar terminologies are associated with proper physical quantities, and only are convenient markers applied to these quantities. It should be understood that, in the whole specification, the discussions adopting the terminologies, such as "process", "add", "obtain", "start", "detect", "save", "install", "execute", "decompress" or "synchronize", may refer to actions and processing of a data processing system or a similar electronic device, unless specific declaration in another manner is obviously found in the discussion below. The data processing system or electronic device manipulates data represented by physical (electronic) quantities in a register and a memory of a system and converts the data into other data represented by physical quantities in a similar manner in the memory or the register of the system, or another information storage, transmission or display device of this kind.

It should be noted that, an Android installation package involved in an embodiment of the present disclosure is called APK for short with a full name of Android installation package. An APK file can be installed after the file is directly transferred to an Android emulator or an Android mobile phone for execution. In fact, the APK file is in a zip format, but an extension is changed to be apk. After UnZip decompression, a Dex file can be seen. Dex is an abbreviation of Dalvik VM executes, that is, an Android Dalvik executive program, which is not Java ME bytecodes but Dalvik bytecodes.

A package service list is a package service list and saved in a random access memory. A preset data base data base is a storage path or storage directory, and is saved in a read-only memory. A system application directory is /system/app, a data application directory is /data/app, and the system application directory and data application directory are saved in the same read-only memory. A record in the data base is: record, and is used to record information of an apk file, such as a file name, creation time and a file size, or used to record an index of information of an apk file, such as a file name, creation time and a file size. Additionally, the preset data base, the system application directory and the data application directory can be saved in the same read-only memory.

Embodiment 1

Figure 1:
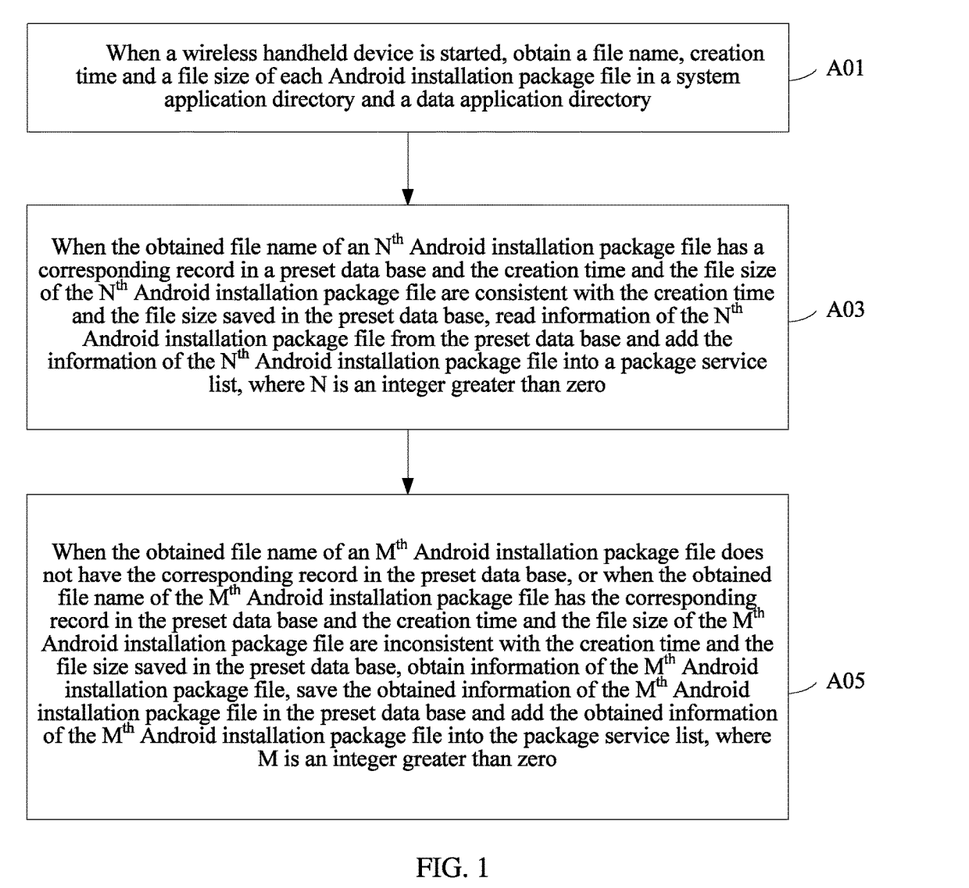
FIG. 1 is a flowchart of a startup method provided by Embodiment 1 of the present disclosure.

Referring to FIG. 1, a startup method provided in Embodiment 1 is specifically as follows.

A01: When a wireless handheld device is started, obtain a file name, creation time and a file size of each Android installation package file in a system application directory and a data application directory.

When a wireless handheld device is started, each Android installation package (APK) file in the system application directory (/system/app) and the data application directory (/data/app) is scanned to read the file name, the creation time and the file size of each APK file. It should be noted that, as complement or exception, at least one or any combination of the file name, the creation time, the file size and a version number of each APK file can also be read.

It should be noted that, the startup described above refers to cold start, that is to say, the startup under a situation that the wireless handheld device is completely turned off, such as first startup of the wireless handheld device, or the startup performed after a battery is unplugged and then the batter is installed. The cold start is referred relative to hot start. The hot start refers to that, some wireless handheld devices adopt an incomplete turnoff manner, namely, after running for a period of time before being turned off, that is to say, some of functional modules are not turned off. This turnoff manner can increase a startup speed. The method adopted by the embodiment of the present disclosure is applicable to a scenario of cold start of a wireless handheld device.

A03: When the obtained file name of an $N^{th}$ Android installation package file has a corresponding record in a preset data base and the creation time and the file size of the $N^{th}$ Android installation package file are consistent with the creation time and the file size saved in the preset data base, read information of the $N^{th}$ Android installation package file from the preset data base and add the information of the $N^{th}$ Android installation package file into a package service list, where N is an integer greater than zero.

The information of the $N^{th}$ Android installation package file includes, but is not limited to, providers (providers), services (services), receivers (receivers), activities (activities), permissionGroups (permissionGroups), permissions (permissions) and instrumentation (instrumentation).

A corresponding record (record) corresponding to the file name is obtained from the preset data base (data base); if the record of the $N^{th}$ APK file is saved in the data base, and when it is compared that the obtained creation time and file size of the $N^{th}$ APK file are consistent with the creation time and the file size saved in the corresponding record in the data base, the information of the $N^{th}$ APK file is read from the data base, and the information of the $N^{th}$ APK file is added into the package service list, where N is an integer greater than zero.

It should be noted that, if the number of obtained APK files in step A03 is L, N is an integer greater than zero and less than or equal to L. That is to say, for all the file names of the L obtained APK files, it needs to determine whether the data base saves records. If the $N^{th}$ APK file has a record, it needs to further determine whether the obtained creation time and file size of the $N^{th}$ APK file are consistent with the creation time and the file size saved in the corresponding record in the data base. If yes, the information of the $N^{th}$ APK file is read from the data base, and the information of the $N^{th}$ APK file is added into the package service list.

A05: When the obtained file name of an $M^{th}$ Android installation package file does not have the corresponding record in the preset data base, or when the obtained file name of an $M^{th}$ Android installation package file has the corresponding record in the preset data base and the creation time and the file size of the $M^{th}$ Android installation package file are inconsistent with the creation time and the file size saved in the preset data base, obtain information of the $M^{th}$ Android installation package file, save the obtained information of the $M^{th}$ Android installation package file in the preset data base, and add the obtained information of the $M^{th}$ Android installation package file into the package service list, where M is an integer greater than zero.

The information of the $M^{th}$ Android installation package file includes, but is not limited to, providers, services, receivers, activities, permissionGroups, permissions and instrumentation.

The corresponding record (record) of the obtained APK file is read from the preset data base. If the record of the $M^{th}$ APK file does not exist in the data base, a function scanPackageLI is invoked to parse a Package out of the $M^{th}$ APK file, information of the Package is saved in the data base, and the information of the Package is added into the package service list.

Alternatively, when the obtained file name of the $M^{th}$ Android installation package file has the corresponding record in the preset data base, and the creation time and the file size of the $M^{th}$ Android installation package file are inconsistent with the creation time and the file size saved in the preset data base, the function scanPackageLI is invoked to parse the Package out of the $M^{th}$ APK file, the information of the Package is saved in the data base, and the information of the Package is added into the package service list, where M is an integer greater than zero.

It should be noted that, if the number of obtained APK files in step A03 is L, M is an integer greater than zero and less than or equal to L. That is to say, for all the file names of the L obtained APK files, it needs to determine whether the data base saves records. If the $M^{th}$ APK file does not have the corresponding record in the data base, the function scanPackageLI is invoked to parse the Package out of the $M^{th}$ APK file, the information of the Package is saved in the data base, and the information of the Package is added into the package service list.

When the obtained file name of the $M^{th}$ Android installation package file has the corresponding record in the preset data base and the creation time and the file size of the $M^{th}$ Android installation package file are inconsistent with the creation time and the file size saved in the preset data base, the function scanPackageLI is invoked to parse the Package out of the $M^{th}$ APK file, the information of the Package is saved in the data base, and the information of the Package is added into the package service list, where M is an integer greater than zero.

It should be noted that, the information of the Package includes, but is not limited to, providers, services, receivers, activities, permissionGroups, permissions and instrumentation.

It should be noted that, an executive subject of steps A01 to A05 is a wireless handheld device.

In the startup method provided by Embodiment 1, by saving the information of each APK file in /system/app and /data/app, such as the file name, the creation time and the file size, in the preset data base, parsing of all the APK files in /system/app and /data/app during every startup is avoided, thereby improving a startup speed of the wireless handheld device.

Embodiment 2

Figure 2:
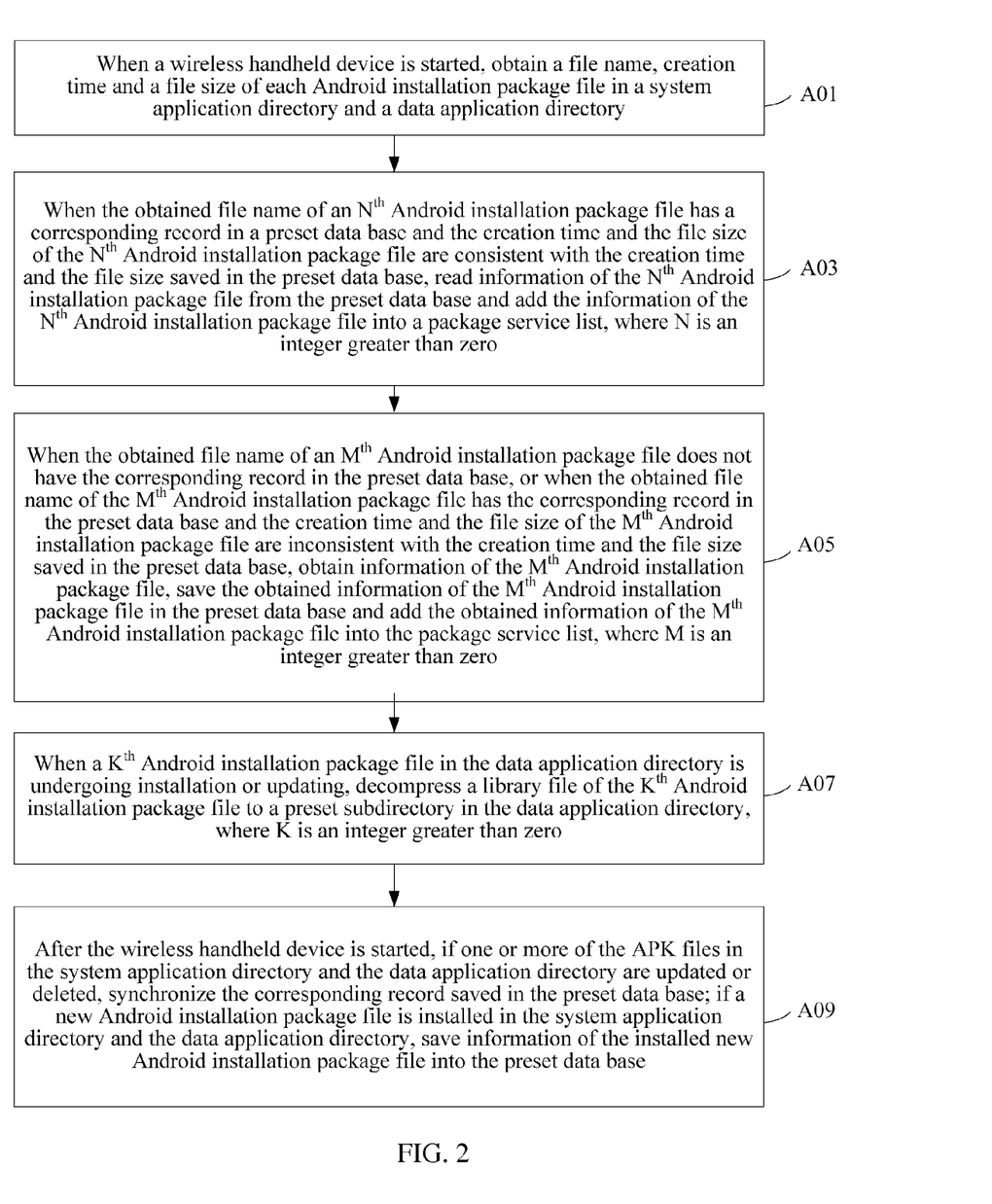
FIG. 2 is a flowchart of another startup method provided by Embodiment 2 of the present disclosure.

Embodiment 2 provides another startup method. As is shown in FIG. 2, firstly, an application scenario is the same as that of Embodiment 1, and steps A01 and A05 are the same as the corresponding steps in Embodiment 1, which are not repeated herein.

Optionally, before or after step A03, or between steps A03 and A05, or after step A05, the method further includes:

A07: When a $K^{th}$ Android installation package file in the data application directory is undergoing installation or updating, decompress a library file of the $K^{th}$ Android installation package file to a preset subdirectory in the data application directory, where K is an integer greater than zero.

In a startup process of the wireless handheld device, if a certain APK file (the $K^{th}$ APK file) in /data/app is undergoing installation or updating, the library file of the $K^{th}$ Android installation package file is decompressed to the preset subdirectory in /data /app, that is to say, an Unpacking libs operation is executed; otherwise, the operation of decompressing the library file is not executed, that is, the Unpacking libs operation is not executed.

It should be noted that, if there are H APK files in /data/app, K is an integer larger than zero and less than or equal to H. The preset subdirectory may be /data/app/data, or may be another subdirectory, which is not limited herein.

Step A07 is an optional step, by adding the step, the wireless handheld device does not necessarily need to execute the operation of decompressing the library file for all APK files in /data/app, but to execute the operation of decompressing the library file only for the APK file that is undergoing installation or updating in /data/app in the startup process, thereby further reducing the startup time of the wireless handheld device.

It should be noted that, step A07 may be executed between steps A01 and A03, or may be executed between steps A03 and A05, or may be executed after step A05.

Optionally, after step A07, the method further includes:

A09: After the wireless handheld device is started, if one or more of the APK files in the system application directory and the data application directory are updated or deleted, synchronize the corresponding record saved in the preset data base; if a new Android installation package file is installed in the system application directory or the data application directory, save information of the installed new Android installation package file into the preset data base.

After the startup of the wireless handheld device is completed, that is, after the wireless handheld device is booted, if one or more of the APK files in /system/app and /data/app are updated or deleted, the corresponding record(s) saved in the data base is synchronized; if a new Android installation package file is installed in /system/app or /data/app, the information of the installed new APK file is saved in the data base.

It should be noted that, the information of the installed new APK file includes a file name, creation time and a file size. It should be understood that, as complement or exception, a version number or the like may be further included.

It should be noted that, step A09 is an optional step, by adding step A09, the preset data base can be synchronized in time, and executing the operation of parsing the APK file in next startup can be avoided, thereby further reducing the startup time of the wireless handheld device.

In the startup method provided by Embodiment 2, by saving the information of each APK file in /system/app and /data/app, such as the file name, the creation time and the file size, in the preset data base, parsing of all the APK files in /system/app and /data/app during every startup is avoided, thereby improving a startup speed of the wireless handheld device; by executing the operation of decompressing a library file merely for the APK file that is undergoing installation or updating in /data/app in the startup process, the startup time of the wireless handheld device is further reduced; furthermore, by synchronizing the preset data base in time, executing the operation of parsing the APK file in next startup can be avoided, thereby further reducing the startup time of the wireless handheld device.

Embodiment 3

Figure 3:
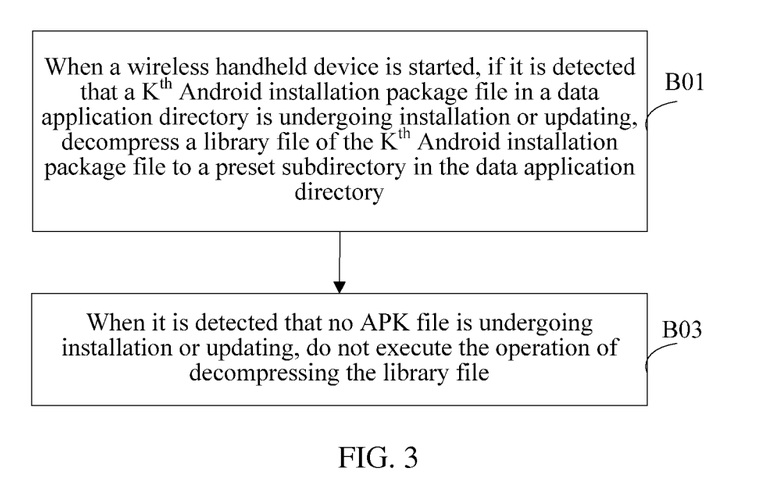
FIG. 3 is a flowchart of a startup method provided by Embodiment 3 of the present disclosure.

Embodiment 3 provides another startup method. As is shown in FIG. 3, firstly, an application scenario is the same as that of Embodiment 1 and Embodiment 2. Specifically, referring to FIG. 3, specific steps of a startup method provided in Embodiment 3 are described as follows.

B01: When a wireless handheld device is started, if it is detected that a $K^{th}$ Android installation package file in a data application directory is undergoing installation or updating, decompress a library file of the $K^{th}$ Android installation package file to a preset subdirectory in the data application directory, where K is an integer greater than zero.

When the wireless handheld device is started, it is detected whether each APK file in /data/app is undergoing installation or updating, and if it is detected that one or more APK files are undergoing installation or updating, the library file of the APK file undergoing installation or updating is decompressed to a preset subdirectory in a data base, that is, an Unpacking libs operation is executed.

It should be noted that, if there are H APK files in /data/app, K is an integer larger than zero and less than or equal to H. The preset subdirectory may be /data/app/data or another subdirectory, which is not limited herein.

Optionally, B03: when it is detected that no APK file is undergoing installation or updating, do not execute the operation of decompressing the library file.

When it is detected that no APK file is undergoing installation or updating, the operation of decompressing the library file is not executed, that is, the Unpacking libs operation is not executed.

It should be noted that, an executive subject of steps B01 to B03 is a wireless handheld device.

In the startup method provided by Embodiment 3, by executing the operation of decompressing a library file merely for an APK file undergoing installation or updating in /data/app in a startup process, the startup time of the wireless handheld device is reduced.

Embodiment 4

Embodiment 4 provides another startup method. As shown in FIG. 4, firstly, an application scenario is the same as that of Embodiment 1 to Embodiment 3, and steps B01 and B03 are the same as the corresponding steps of Embodiment 3, which are not repeated herein.

Optionally, before or after step B01, or between steps B01 and B03, or after step B03, the method further includes:

B05: When a wireless handheld device is started, obtain a file name, creation time and a file size of each Android installation package file in a system application directory and a data application directory.

When the wireless handheld device is started, each Android installation package (APK) file in the system application directory (/system/app) and the data application directory (/data/app) is scanned to read the file name, the creation time and the file size of each APK file.

Optionally, after step B05, the method further includes:

B07: When the obtained file name of an $N^{th}$ Android installation package file has a corresponding record in a preset data base, and the creation time and the file size of the $N^{th}$ Android installation package file are consistent with the creation time and the file size saved in the preset data base, read information of the $N^{th}$ Android installation package file from the preset data base and add the information of the $N^{th}$ Android installation package file into a package service list, where N is an integer greater than zero.

The information of the $N^{th}$ Android installation package file includes, but is not limited to, providers, services, receivers, activities, permissionGroups, permissions and instrumentation.

A corresponding record (record) corresponding to the file name is obtained from the preset data base (data base); if the record of the $N^{th}$ APK file is saved in the data base, and when it is compared that the obtained creation time and file size of the $N^{th}$ APK file are consistent with the creation time and the file size saved in the corresponding record in the data base, the information of the $N^{th}$ APK file is read from the data base, and the information of the $N^{th}$ APK file is added into the package service list, where N is an integer greater than zero.

It should be noted that, if the number of obtained APK files in step B05 is L, N is an integer greater than zero and less than or equal to L. That is to say, for all the file names of the L obtained APK files, it needs to determine whether the data base saves records. If the $N^{th}$ APK file has the record, it needs to further determine whether the obtained creation time and file size of the $N^{th}$ APK file are consistent with the creation time and the file size saved in the corresponding record in the data base. If yes, the information of the $N^{th}$ APK file is read from the data base, and the information of the $N^{th}$ APK file is added into the package service list.

Optionally, after step B05, or after step B07, or between steps B05 and B07, the method further includes:

B09: When the obtained file name of an $M^{th}$ Android installation package file does not have the corresponding record in the preset data base, or when the obtained file name of the $M^{th}$ Android installation package file has the corresponding record in the preset data base and the creation time and the file size of the $M^{th}$ Android installation package file are inconsistent with the creation time and the file size saved in the preset data base, obtain information of the $M^{th}$ Android installation package file, save the obtained information of the $M^{th}$ Android installation package file in the preset data base, and add the obtained information of the $M^{th}$ Android installation package file into the package service list, where M is an integer greater than zero.

The information of the $M^{th}$ Android installation package file includes, but is not limited to, providers, services, receivers, activities, permissionGroups, permissions and instrumentation.

The corresponding record (record) of the obtained APK file is read from the preset data base (data base). If the record of the $M^{th}$ APK file does not exist in the data base, a function scanPackageLI is invoked to parse a Package out of the $M^{th}$ APK file, information of the Package is saved in the data base, and the information of the Package is added into the package service list.

Alternatively, when the obtained file name of the $M^{th}$ Android installation package file has the corresponding record in the preset data base, and the creation time and the file size of the $M^{th}$ Android installation package file are inconsistent with the creation time and the file size saved in the data base, the function scanPackageLI is invoked to parse the Package out of the $M^{th}$ APK file, the information of the Package is saved in the data base, and the information of the Package is added into the package service list, where M is an integer greater than zero.

It should be noted that, if the number of obtained APK files in step B05 is L, M is an integer greater than zero and less than or equal to L. That is to say, for all the file names of the L obtained APK files, it needs to determine whether the data base saves records. If the $M^{th}$ APK file does not have the corresponding record in the data base, the function scanPackageLI is invoked to parse the Package out of the $M^{th}$ APK file, the information of the Package is saved in the data base, and the information of the Package is added into the package service list.

When the obtained file name of the $M^{th}$ Android installation package file has the corresponding record in the preset data base, and the creation time and the file size of the $M^{th}$ Android installation package file are inconsistent with the creation time and the file size saved in the preset data base, the function scanPackageLI is invoked to parse the Package out of the $M^{th}$ APK file, the information of the Package is saved in the data base, and the information of the Package is added into the package service list, where M is an integer greater than zero.

It should be noted that, the information of the Package includes, but is not limited to, providers, services, receivers, activities, permissionGroups, permissions and instrumentation.

Optionally, after step B07 or step B09, the method further includes:

B11: After the wireless handheld device is started, if one or more of the APK files in the system application directory and the data application directory are updated or deleted, synchronize the corresponding record saved in the preset data base; if a new Android installation package file is installed in the system application directory or the data application directory, save information of the installed new Android installation package file in the preset data base.

After the startup of the wireless handheld device is completed, that is, after the wireless handheld device is booted, if one or more of the APK files in /system/app and /data/app are updated or deleted, the corresponding record saved in the data base is synchronized; if a new APK file is installed in /system/app or /data/app, the information of the installed new APK file is saved in the data base.

It should be noted that, the information of the installed new APK file includes a file name, creation time and a file size. It should be understood that, as complement or exception, a version number or the like may be further included.

It should be noted that, step B11 is an optional step, by adding step B11, the preset data base can be synchronized in time, and executing the operation of parsing an APK file in next startup can be avoided, thereby further reducing the startup time of the wireless handheld device.

It should be noted that, an executive subject of steps B01 to B11 is the wireless handheld device.

In the startup method provided by Embodiment 4, by executing the operation of decompressing a library file merely for the APK file undergoing installation or updating in /data/app in a startup process, the startup time of the wireless handheld device is reduced; by saving the information of each APK file in /system/app and /data/app, such as the file name, the creation time and the file size, in the preset data base, parsing of all APK files in /system/app and /data/app during every startup is avoided, thereby improving a startup speed of the wireless handheld device; furthermore, by further synchronizing the preset data base in time, executing the operation of parsing the APK file in next startup can be avoided, thereby further reducing the startup time of the wireless handheld device.

The sequence numbers of the preceding embodiments of the present disclosure are merely for description purpose, but do not indicate the preference of the embodiments.

Through the above description of the implementation, it is clear to persons skilled in the art that the present disclosure may be accomplished through hardware, or through software plus a necessary universal hardware platform. Based on such understanding, the technical solutions of the present disclosure may be embodied in the form of a software product. The software product may be stored in one non-volatile storage media (for example, CD-ROM, U-disk, or removable hard disk) and contains several instructions adapted to instruct one set of computer equipment (for example, a personal computer, a server, or network equipment) to perform the method according to each embodiment of the present disclosure.

Embodiment 5

Figure 5:
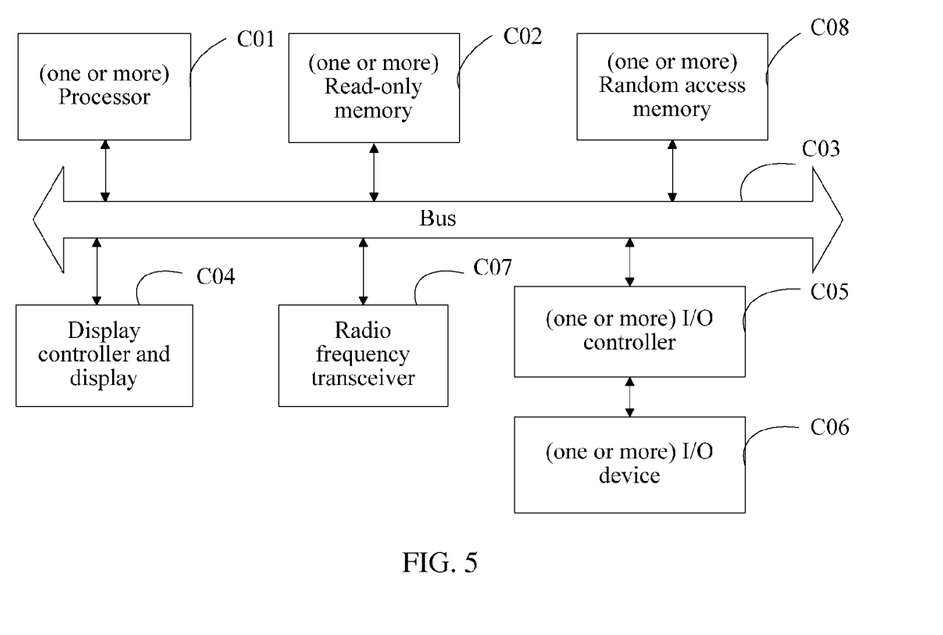
FIG. 5 is a schematic diagram of a wireless handheld device provided by Embodiment 5 of the present disclosure.

FIG. 5 is a block diagram of a wireless handheld device provided by an embodiment of the present disclosure. The wireless handheld device may include at least one processor C01, at least one read-only memory (ROM) C02 and at least one random access memory (RAM) C08, which are coupled to each other through a bus C03.

Optionally, the wireless handheld device further includes a display controller and a display C04 coupled to another component through the bus.

Optionally, the wireless handheld device further includes one or more I/O (input/output) controllers C05 coupled to other components through the bus. One or more I/O (input/ output) controllers C05 provide an interface/interfaces for one or more I/O (input/output) devices C06.

Optionally, the wireless handheld device further includes a radio frequency transceiver C07 coupled to another component through the bus.

The bus C03 may include one or more buses connected to each other through various bridges, controllers and/or adapters known in the art. The I/O device C06 may include the controller of a keypad, a keyboard or a cursor, or a touch screen.

Embodiment 5 of the present disclosure provides a wireless handheld device, which includes:
- at least one read-only memory C02;
- at least one random access memory C08; and
- at least one processor C01, coupled to the read-only memory C02 and the random access memory C08, where the processor C01 is configured to obtain a file name, creation time and a file size of each Android installation package file in a system application directory and a data application directory in the read-only memory C02 when the wireless handheld device is started; when the obtained file name of an $N^{th}$ Android installation package file has a corresponding record in a preset data base in the read-only memory C02, and the creation time and the file size of the $N^{th}$ Android installation package file are consistent with the creation time and the file size saved in the preset data base, read information of the $N^{th}$ Android installation package file from the preset data base and add the information of the $N^{th}$ Android installation package file into a package service list in the random access memory C08, where N is an integer greater than zero; when the obtained file name of an $M^{th}$ Android installation package file does not have a corresponding record in a preset data base, or when the obtained file name of an $M^{th}$ Android installation package file has a corresponding record in a preset data base and the creation time and the file size of the $M^{th}$ Android installation package file are inconsistent with the creation time and the file size saved in the preset data base, obtain information of the $M^{th}$ Android installation package file, save the obtained information of the $M^{th}$ Android installation package file in the preset data base, and add the obtained information of the $M^{th}$ Android installation package file into a package service list, where M is an integer greater than zero.

Optionally, the processor C01 is further configured to decompress a library file of a $K^{th}$ Android installation package file to a preset subdirectory in the data application directory when the $K^{th}$ Android installation package file in the data application directory is undergoing installation or updating, where K is an integer greater than zero.

Optionally, the processor C01 is further configured to synchronize the corresponding record saved in the preset data base after the wireless handheld device is started, if one or more of the Android installation package files in the system application directory and the data application directory are updated or deleted; if a new Android installation package file is installed in the system application directory or the data application directory, save information of the installed new Android installation package file into the preset data base.

It should be noted that, for operations performed by each hardware of the wireless handheld device or performed by the hardware and corresponding software jointly, reference may be made to A01 to A05 of the method in Embodiment 1 or A01 to A09 in Embodiment 2, and details are not repeated herein.

Additionally, a computer readable medium (or medium) is further provided, which includes computer readable instructions being executed for performing the following operations: performing the operations of A01 to A05 in Embodiment 1, or performing the operations of A01 to A09 in Embodiment 2.

According to a first wireless handheld device provided by Embodiment 5 of the present disclosure, by saving the information of each APK file in /system/app and /data/app, such as the file name, the creation time and the file size, in the preset data base, parsing of all the APK files in /system/app and /data/app during every startup is avoided, thereby improving a startup speed of the wireless handheld device; by executing the operation of decompressing a library file merely for the APK file undergoing installation or updating in /data/app in a startup process, the startup time of the wireless handheld device is further reduced; furthermore, by synchronizing the preset data base in time, executing the operation of parsing the APK file in next startup can be avoided, thereby further reducing the startup time of the wireless handheld device.

Embodiment 5 of the present disclosure further provides another wireless handheld device, which includes:
- at least one read-only memory C02;
- at least one random access memory C08; and
- at least one processor C01, coupled to the read-only memory C02 and the at least one the random access memory C08, where the processor C01 is configured to, when the wireless handheld device is started and if it is detected that a $K^{th}$ Android installation package file in a data application directory in the read-only memory C02 is undergoing installation or updating, decompress a library file of the $K^{th}$ Android installation package file to a preset subdirectory in the data application directory, and K is an integer greater than zero.

Optionally, the processor C01 is further configured to, when the wireless handheld device is started, obtain a file name, creation time and a file size of each Android installation package file in a system application directory and the data application directory stored in the read-only memory C02; when the obtained file name of an $N^{th}$ Android installation package file has a corresponding record in a preset data base in the read-only memory C02 and the creation time and the file size of the $N^{th}$ Android installation package file are consistent with the creation time and the file size saved in the preset data base, read information of the $N^{th}$ Android installation package file from the preset data base and add the information of the $N^{th}$ Android installation package file into a package service list in the random access memory C08, where N is an integer greater than zero; when the obtained file name of an $M^{th}$ Android installation package file does not have a corresponding record in a preset data base, or when the obtained file name of an $M^{th}$ Android installation package file has a corresponding record in a preset data base and the creation time and the file size of the $M^{th}$ Android installation package file are inconsistent with the creation time and the file size saved in the preset data base, obtain information of the $M^{th}$ Android installation package file, save the obtained information of the $M^{th}$ Android installation package file in the preset data base, and add the obtained information of the $M^{th}$ Android installation package file into a package service list, where M is an integer greater than zero.

Optionally, the processor C01 is further configured to synchronize the corresponding record saved in the preset data base after the wireless handheld device is started, if one or more of the Android installation package files in the system application directory and the data application directory are updated or deleted; if a new Android installation package file is installed in the system application directory or the data application directory, save information of the installed new Android installation package file into the preset data base.

It should be noted that, for operations performed by each hardware of the wireless handheld device or performed by the hardware and the corresponding software jointly, reference may be made to B01 to B03 of the method in Embodiment 3 or B01 to B11 in Embodiment 4, and details are not repeated herein.

Additionally, a computer readable medium (or medium) is further provided, which includes computer readable instructions for performing the following operations when being executed: performing the operations of B01 to B03 in Embodiment 3, or performing the operations of B01 to B11 in Embodiment 4.

According to the wireless handheld device provided by the embodiment of the present disclosure, by executing the operation of decompressing the library file merely for the APK file undergoing installation or updating in /data/app in a startup process, the startup time of the wireless handheld device is reduced; by saving the information of each APK file in /system/app and /data/app, such as the file name, the creation time and the file size, in the preset data base, parsing of all the APK files in /system/app and /data/app during every startup is avoided, thereby further improving a startup speed of the wireless handheld device; furthermore, by synchronizing the preset data base in time, executing the operation of parsing the APK file in next startup can be avoided, thereby further reducing the startup time of the wireless handheld device.

Those skilled in the art can understand that the drawings are merely illustrative for a preferred embodiment, and the modules, entities, or flows in the drawings are not necessarily required for implementing the present disclosure.

It can be clearly understood by persons skilled in the art that, for the purpose of convenient and brief description, for the specific working process of the foregoing apparatus or device, reference may be made to the corresponding processes in the method embodiments, and the details are not described herein again.

In several embodiments provided in the present application, it should be understood that the disclosed device and method may be implemented in other manners. For example, the described device embodiments are merely exemplary. For example, the division of the device is merely the division with respect to logical functions and other division manners may be available in actual implementation. For example, multiple devices may be combined or integrated into another device, or some features may be ignored or not performed. Furthermore, the shown or discussed coupling or direct coupling or communication connection may be implemented through some interfaces, and indirect coupling or communication connection between apparatuses or devices may be electrical, mechanical, or in other forms.

In addition, devices according to each embodiment of the present disclosure may be integrated into one device or unit, or each unit may exist as a separate physical unit, or two or more units may also be integrated into one device or unit.

When being implemented in the form of a software function unit, and sold or used as a stand-alone product, the functions may be stored in a computer-readable storage medium. Based on such understanding, the essence of the technical solutions of the present disclosure, or part that makes contributions to the prior art, or part of the technical solution may be embodied in the form of a software product. The computer software product is stored in a storage medium, and incorporates several instructions for instructing a computer device (for example, personal computer, server, or network device) to execute all or part of the steps of the method in each embodiment of the present disclosure. The storage medium includes any medium that can store a program code, such as a U-disk, a removable hard disk, a read-only memory (Read-Only Memory, ROM), a random access memory (Random Access Memory, RAM), a magnetic disk, or a CD-ROM.

The above description is merely about the specific implementation of the present invention, but not intended to limit the protection scope of the present invention. Any variations or replacement that can be easily derived by those skilled in the art within the technical scope disclosed by the present invention shall fall within the protection scope of the present invention. Therefore, the protection scope of the present invention is subject to the appended claims.

What is claimed is:

1. A method performed by a wireless device, comprising:
after the wireless device is turned on from being completely turned off or after a battery is reconnected to the wireless device from being disconnected, scanning a directory for system applications and a directory for data applications of the device when the wireless device is started;
reading a file name, a creation time, and a file size of a first application package (APK) and a second APK from one of the directory for system applications and the directory for data applications of the wireless device;
for the first APK, determining a record exists in a preset database that corresponds to the file name, the creation time, and the file size of the first APK, and obtaining attribute information of the first APK from the preset database, wherein the preset database is different from the directory for system applications and the directory for data applications, thereby avoiding parsing the first APK file;
for the second APK, determining that a record does not exist in the preset database that corresponds to the file name, the creation time, and the file size of the second APK, and obtaining attribute information of the second APK by parsing the second APK; and
adding the obtained attribute information of the first APK and the second APK into a package service list.

2. The method of claim 1, wherein the obtaining attribute information of the first APK from the preset database comprises: obtaining the attribute information of the first APK from the record for the first APK from the preset database.

3. The method of claim 1, further comprising:
saving the attribute information of the second APK into the preset database after the second APK is parsed.

4. The method of claim 3, further comprising:
synchronizing the attribute information of the second APK in the preset data base in a case that the second APK is updated or deleted.

5. The method of claim 1, further comprising:
updating the preset data base in a case a new APK is installed.

6. The method of claim 1, wherein the attribute information of the first APK comprises at least one of: a provider of the first APK and permissions related to the first APK.

7. The method of claim 1, further comprising:
for the third APK that is undergoing updating, decompressing a library file of the third APK to a preset subdirectory in the directory for data applications.

8. A wireless device, comprising:
a memory storing instructions; and
a processor coupled to the memory, wherein the processor is configured to execute the instructions stored in the memory to cause the wireless device to:
after the wireless device is turned on from being completely turned off or after a battery is reconnected to the wireless device from being disconnected, scan a directory for system applications and a directory for data applications of the wireless device when the wireless device is started;
read a file name, a creation time, and a file size of a first application package (APK) and a second APK from one of the directory for system applications and the directory for data applications of the wireless device;
for the first APK, determine a record exists in a preset database that corresponds to the file name, the creation time, and the file size of the first APK, and obtain attribute information of the first APK from the preset database, wherein the preset database is different from the directory for system applications and the directory for data applications, thereby avoiding parsing the first APK file;
for the second APK, determine that a record does not exist in the preset database that corresponds to the file name, the creation time, and the file size of the second APK, and obtain attribute information of the second APK by parsing the second APK; and
add the obtained attribute information of the first APK and the second APK into a package service list.

9. The method of claim 8, wherein
obtaining the attribute information of the first APK from the preset database comprises: obtaining the attribute information of the first APK from the record for the first APK from the preset database.

10. The wireless device of claim 8, wherein the attribute information of the second APK is saved into the preset database after the second APK is parsed.

11. The wireless device of claim 10, wherein the attribute information of the second APK in the preset data base is synchronized in a case that the second APK is updated or deleted.

12. The wireless device of claim 8, wherein the preset data base is updated in a case a new APK is installed.

13. The wireless device of claim 8, wherein the attribute information of the first APK comprises at least one of: a provider of the first APK and permissions related to the first APK.

14. The wireless device of claim 8, wherein, for the third APK that is undergoing updating, a library file of the third APK is decompressed to a preset subdirectory in the directory for data applications.

* * * * *